United States Patent
Kühne et al.

(10) Patent No.: US 11,366,326 B2
(45) Date of Patent: Jun. 21, 2022

(54) METHOD FOR OPERATING A HEAD-MOUNTED ELECTRONIC DISPLAY DEVICE, AND DISPLAY SYSTEM FOR DISPLAYING A VIRTUAL CONTENT

(71) Applicant: AUDI AG, Ingolstadt (DE)

(72) Inventors: Marcus Kühne, Beilngries (DE); Daniel Profendiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/650,680

(22) PCT Filed: Sep. 24, 2018

(86) PCT No.: PCT/EP2018/075776
§ 371 (c)(1),
(2) Date: Mar. 25, 2020

(87) PCT Pub. No.: WO2019/063475
PCT Pub. Date: Apr. 4, 2019

(65) Prior Publication Data
US 2021/0199980 A1     Jul. 1, 2021

(30) Foreign Application Priority Data

Sep. 26, 2017    (DE) ..................... 10 2017 217 027.1

(51) Int. Cl.
*G09G 5/00* (2006.01)
*G02B 27/01* (2006.01)
*B60K 35/00* (2006.01)

(52) U.S. Cl.
CPC .......... *G02B 27/0179* (2013.01); *B60K 35/00* (2013.01); *G02B 27/0172* (2013.01);
(Continued)

(58) Field of Classification Search
CPC .................................. G06F 3/011; B60K 35/00
See application file for complete search history.

(56) References Cited

U.S. PATENT DOCUMENTS 5,334,969 A * 8/1994 Abe ..................... B60R 25/1009
    180/123
9,459,692 B1 * 10/2016 Li ........................... G01S 5/163
(Continued)

FOREIGN PATENT DOCUMENTS

CN     104977717 A    10/2015
DE   102014206623 A1   10/2015
(Continued)

OTHER PUBLICATIONS

International Search Report dated Dec. 13, 2018, from International Application No. PCT/EP2018/075776, 5 pages.
(Continued)

*Primary Examiner* — Nan-Ying Yang
(74) *Attorney, Agent, or Firm* — Staas & Halsey LLP

(57) ABSTRACT

A relative movement of a head-wearable electronic display device is determined with respect to a vehicle interior of a vehicle by way of a recording device arranged on the electronic display device and a virtual perspective of a wearer of the electronic display device is adapted to virtual content according to the determined relative movement. A recording range of the recording device is limited to the vehicle interior in order to eliminate distortions, resulting from a relative movement of the vehicle with respect to the vehicle surroundings, with regard to the recording of the relative movement of the electronic display device with respect to the vehicle interior.

13 Claims, 1 Drawing Sheet

(52) U.S. Cl.
CPC ............... *B60K 2370/1529* (2019.05); *B60K 2370/177* (2019.05); *G02B 2027/014* (2013.01); *G02B 2027/0138* (2013.01); *G02B 2027/0183* (2013.01)

(56) References Cited

U.S. PATENT DOCUMENTS

| | | | |
|---|---|---|---|
| 2005/0046953 A1 | 3/2005 | Repetto et al. | |
| 2014/0092332 A1* | 4/2014 | Price | B60R 1/001 349/16 |
| 2015/0294505 A1 | 10/2015 | Atsmon | |
| 2016/0364008 A1 | 12/2016 | Chun et al. | |
| 2017/0113641 A1 | 4/2017 | Thieberger et al. | |
| 2018/0061134 A1* | 3/2018 | Ota | B60K 35/00 |

FOREIGN PATENT DOCUMENTS

| | | |
|---|---|---|
| EP | 1510849 A1 | 3/2005 |
| EP | 2933707 A1 | 10/2015 |
| GB | 2347573 A | 9/2000 |
| WO | 2010/004547 A1 | 1/2010 |
| WO | 2017/031273 A1 | 2/2017 |

OTHER PUBLICATIONS

German Office Action dated Aug. 16, 2018, from German Application No. 10 2017 217 027.1, 10 pages.
PCT/EP2018/075776, filed Sep. 24, 2018, Marcus Kühne, Audi AG.
10 2017 217 027.1, filed Sep. 26, 2017, Marcus Kühne, Audi AG.
English Translation of International Preliminary Report on Patentability for International Application No. PCT/EP2018/075776, dated Sep. 11, 2020, 7 pages.
Chinese Office Action dated Jun. 1, 2021, in Chinese Patent Application No. 201880062488.7.

* cited by examiner

METHOD FOR OPERATING A HEAD-MOUNTED ELECTRONIC DISPLAY DEVICE, AND DISPLAY SYSTEM FOR DISPLAYING A VIRTUAL CONTENT

CROSS REFERENCE TO RELATED APPLICATIONS

This application is a U.S. national stage of International Application No. PCT/EP2018/075776, filed on Sep. 24, 2018. The International Application claims the priority benefit of German Application No. 10 2017 217 027.1 filed on Sep. 26, 2017. Both International Application No. PCT/EP2018/075776 and German Application No. 10 2017 217 027.1 are incorporated by reference herein in their entirety.

BACKGROUND

Described herein is a method for operating a head-wearable electronic display device and to a display system for displaying virtual content.

In the future, an increasing number of people are expected to use immersive technologies in their vehicles, whether this be for support while looking at the driving task or else for entertainment or relaxation during the journey. In this case, it would be advantageous for the virtual content, displayed in the vehicle by way of a head-wearable electronic display device, to match the individual movement of the wearer of the electronic display device. For this purpose, there is a need for what is known as positional tracking, by way of which the relative movements of the head-wearable electronic display device with respect to the surroundings are recorded.

In this case, what is known as inside-out tracking is increasingly used to record movements of such electronic display devices. In inside-out tracking, movements of such electronic display devices are recorded by virtue of a recording device being attached to the electronic display device itself, wherein the recording device is designed to record surroundings of the head-wearable electronic display device and thereby to draw conclusions as to movements of the electronic display device relative to the surroundings. The use of such inside-out tracking methods is problematic in particular within moving vehicles. If for example a wearer of an electronic display device is sitting in a moving motor vehicle, then, seen from the vehicle interior, a wide variety of objects, such as for example trees, other traffic participants and the like, roll past windows of the vehicle. In known inside-out tracking, these objects would likewise also be recorded. Relative movements of the electronic display device with respect to the objects located outside the motor vehicle would be incorrectly taken into consideration when correspondingly adapting a virtual perspective to displayed virtual content. A wearer of such an electronic display device in principle usually however only wishes for his head movements to be converted for example in a 1:1 manner, for example, in virtual surroundings. If the wearer is sitting in a moving vehicle, it should therefore only be taken into consideration how the wearer moves his head relative to the vehicle, and not relative to the external surroundings. If the latter case does occur, incorrect head movements are assumed and implemented incorrectly in the display of virtual content.

U.S. Pat. No. 9,459,692 B1 describes a virtual reality headset that is able to be operated during a journey with a vehicle, wherein the problem outlined at the outset is rectified by virtue of a series of images being recorded by way of a camera, serving as a recording device and attached to the headset, and the image sequence being analyzed. It should thereby be able to be determined to what extent a wearer of the virtual reality headset moves his head relative to a vehicle interior of the vehicle. As an alternative or in addition, there is provision to compare the images recorded by way of the camera serving as recording device with a reference image of the vehicle interior, in order thus to filter out the extent to which the virtual reality headset is moved only in relation to the vehicle interior and not relative to objects located outside the vehicle.

International Application No. WO 2017/031273 A1 describes a method for operating virtual reality glasses during a journey with a vehicle. In order to be able to record the extent to which the virtual reality glasses are moved relative to the vehicle interior particularly accurately, there is provision to use a vehicle sensor system that delivers data regarding the movement of the vehicle. Movements recorded by way of the virtual reality glasses are compared with the data characterizing the vehicle movement in order then to be able to conclude as to the extent to which the virtual reality glasses are moved relative to the vehicle interior.

International Application Publication No. WO 2010/004547 A1 additionally describes a method for adapting virtual content during a journey with a vehicle. A plurality of sensors in this case detect the movement of the vehicle, wherein the displayed virtual content is adapted according to the recorded movement.

SUMMARY

Described herein is a method and a system by way of which a relative movement of an electronic display device with respect to a vehicle interior is able to be determined particularly easily and reliably.

This is achieved by a method for operating a head-wearable electronic display device and by a display system for displaying virtual content having at least some of the features described herein. Advantageous refinements containing expedient and non-trivial developments are also described herein.

In the method for operating a head-wearable electronic display device, a relative movement of the electronic display device with respect to a vehicle interior of a vehicle is determined by way of a recording device arranged on the electronic display device and a virtual perspective of a wearer of the electronic display device is adapted to virtual content according to the determined relative movement. In order to eliminate distortions, resulting from a relative movement of the vehicle with respect to the vehicle surroundings, with regard to the recorded relative movement of the electronic display device with respect to the vehicle, there is provision to limit a recording range of the reception device to the vehicle interior.

In the method, in comparison with the procedure mentioned at the outset, it is thus not necessary, in a complex manner, for example to compare sensor data that characterize the movement of the vehicle with sensor data of the recording device attached to the display device in order to be able to reliably determine the extent to which the electronic display device is moved relative to the vehicle interior of the vehicle. It is also additionally not necessary to compare the sensor data recorded by way of the recording device with a stored reference model of the vehicle interior.

Instead of this, there is provision to limit the recording range of the recording device to the vehicle interior. As a result, the recording device is able to detect only the vehicle interior and thus also detect only relative movements of the electronic display device with respect to the vehicle interior. In the method, it is simply not possible for the recording device to detect relative movements with respect to the exterior of the vehicle. Even if for example vehicle surroundings roll past a side window of the vehicle or else if for example other traffic participants drive past, the recording device is not able to detect this at all since the recording range of the recording device is limited to the vehicle interior.

As a result, only the relative movement of the electronic display device with respect to the vehicle interior, and not with respect to the vehicle exterior, is also always reliably detected. It is thereby also possible always to adapt the virtual perspective of the wearer of the electronic display device according to the recorded head movement, which depends on the recorded relative movement of the electronic display device with respect to the vehicle interior.

The method is advantageous, for example, when the vehicle is moving. The method may however also be used particularly advantageously in a stationary vehicle, for example if the vehicle is parked on a busy road and a multiplicity of other vehicles drive past the parked vehicle in which the wearer of the electronic display device is sitting. In this case as well, it is possible to reliably prevent the recording device arranged on the electronic display device from detecting the vehicles driving past and accordingly outputting incorrect information with regard to the relative movements of the electronic display device.

In the method, external movements, that is to say movements outside the vehicle, are thus ignored. The virtual content may be any virtual content. Virtual surroundings in which the wearer of the electronic display device is completely immersed may in this case be displayed. As an alternative, however, it is also possible for virtual content for augmenting reality to be displayed. Either way, the virtual perspective of the wearer of the electronic display device is reliably adapted according to the correctly determined relative movement of the electronic display device with respect to the vehicle interior.

One advantageous embodiment makes provision for the limitation to be performed by using a sensor of the recording device whose range is limited by construction to the vehicle interior. By way of example, it is possible to use an ultrasound sensor that simply has a range such that only the vehicle interior is able to be recorded. Any other sensors of the recording device whose range is limited by construction to the vehicle interior may also be used.

According to a further advantageous embodiment, there is provision for the limitation to be performed by using a sensor of the recording device whose range is limited to the vehicle interior. This means that the sensor does not necessarily only have a range that is restricted to the vehicle interior. However, the sensor is able to be set variably in terms of its range and thus of its recording space. The limitation is then performed by simply limiting the range of the sensor to the vehicle interior. If the electronic display device is used in the vehicle interior, then the sensor is also able to detect only the vehicle interior. If on the other hand the display device is used outside the vehicle, then the sensor with the variably settable recording range or with the variably settable recording space may also be used to record relatively distant regions of surroundings.

In a further advantageous refinement, there is provision for the limitation to be performed by using a camera of the recording device and in the process for a region located outside the vehicle interior to be set out of focus. By way of example, the camera may include a lens by way of which the surroundings may be set out of focus starting from a certain distance. It is thereby easily possible to record only the vehicle interior, even when using a camera as part of the recording device.

According to a further advantageous embodiment, there is provision for the electronic display device to be used to record whether the vehicle is moving, wherein the recording range of the recording device is limited to the vehicle interior if so. As soon as the electronic display device thus detects that the vehicle is moving, the recording range is limited to the vehicle interior. Without the wearer of the electronic display device having to do anything, it is thereby thus able to be ensured that his head movement relative to the vehicle interior is also automatically converted correctly into a corresponding adaptation of the virtual perspective.

A further advantageous embodiment makes provision for the recording range of the recording device to be limited to the vehicle interior as soon as a predefined user input has been recorded. It is thus also possible for example for the wearer of the electronic display device to be able to manually specify that the recording range should be limited to the vehicle interior. It is thereby easily able to be ensured that the wearer of the electronic display device simply specifies when the recording range should be limited to the vehicle interior. By way of example, independently of the conditions in which the recording range is limited, it is also possible to provide data that describe the dimensions of the vehicle interior. The recording range may be limited in a tailored manner on the basis of these data. The position of the recording device may also additionally be determined by way of suitable sensors, wherein the recording range may be restricted or limited in a tailored manner depending on the current position of the recording device within the vehicle interior, with knowledge of the dimensions of the vehicle interior.

According to a further advantageous embodiment, there is provision for the recording range of the recording device to be limited to the vehicle interior as soon as an application that is restricted to use in the vehicle is executed by way of the electronic display device. By way of example, the electronic display device may execute a drive-in cinema application that is restricted to use in the vehicle. As soon as such an application is executed, the recording range of the recording device is automatically limited to the vehicle interior. As soon as applications that are restricted to use in the vehicle and are therefore used only in the vehicle are thus executed by way of the electronic display device, the recording range of the recording device is adapted automatically.

In a further advantageous refinement, there is provision for the electronic display device to be used to record whether the electronic display device is located in the vehicle interior, wherein the recording range of the recording device is limited to the vehicle interior if so. By way of example, an RFID transponder may be attached to the electronic display device, wherein this transponder is able to be detected by the vehicle or, by contrast, the electronic display device is itself able to detect whether it is located within the vehicle. In the latter case, an RFID transponder that is able to detect the electronic display device may also for example be arranged on the vehicle. Automatically adapting the recording range or restricting the recording range to the vehicle interior as soon as the electronic display device is located in the vehicle interior entails the advantage that, even in the case of a stationary vehicle, traffic participants moving past the vehicle do not contribute to distorting the recording of the relative movement of the electronic display device with respect to the vehicle interior.

The display system for displaying virtual content includes a head-wearable electronic display device, a recording device, arranged on the electronic display device and designed to determine a relative movement of the electronic display device with respect to a vehicle interior of a vehicle, and a control device that is configured so as to adapt a virtual perspective of the electronic display device to virtual content according to the determined relative movement, wherein the control device is configured so as to limit a recording range of the recording device to the vehicle interior in order to eliminate distortions, resulting from a relative movement of vehicle with respect to the vehicle surroundings, with regard to the recording of the relative movement of the electronic display device with respect to the vehicle interior. Advantageous refinements of the method are considered to be advantageous refinements of the display system and vice versa, wherein the display system performs operations of the method. The electronic display device for example includes virtual reality glasses or augmented reality glasses.

Further advantages, features and details become apparent from the following description of example embodiments and with reference to the drawings. The features and combinations of features mentioned above in the description and the features and combinations of features mentioned below in the description of the drawings and/or shown in the drawings are able to be used not only in the respectively specified combination but also in other combinations or on their own without departing from the scope of the disclosure.

BRIEF DESCRIPTION OF THE DRAWINGS

These and other aspects and advantages will become more apparent and more readily appreciated from the following description of the example embodiments, taken in conjunction with the accompanying drawings of which.

DETAILED DESCRIPTION

Figure 1:
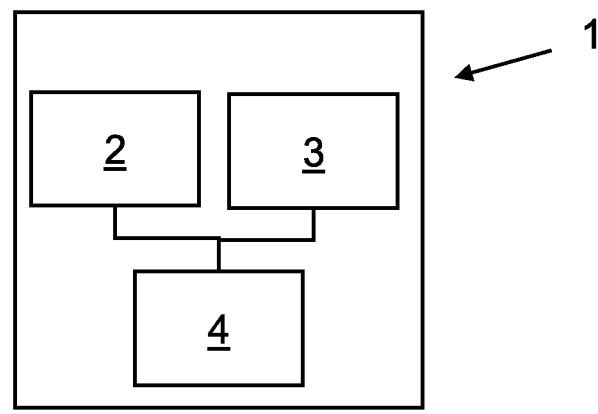
FIG. 1 is a schematic illustration of a display system for displaying virtual content, wherein the display system has virtual reality glasses for displaying the virtual content.

Reference will now be made in detail to examples which are illustrated in the accompanying drawings. In the drawings, functionally identical elements have in each case been provided with the same reference signs.

FIG. 1 shows a schematic illustration of a display system 1 for displaying virtual content. The display system 1 includes a head-wearable electronic display device in the form of virtual reality glasses 2 and a recording device 3 arranged on the virtual reality glasses 2 and that is designed to determine a relative movement of the virtual reality glasses 2 with respect to a vehicle interior, not illustrated here, of a vehicle, likewise not illustrated. The display system 1 furthermore also has a control device (controller) 4 that is configured so as to adapt a virtual perspective of a wearer of the virtual reality glasses 2 to the virtual content according to the determined relative movement.

Figure 2:
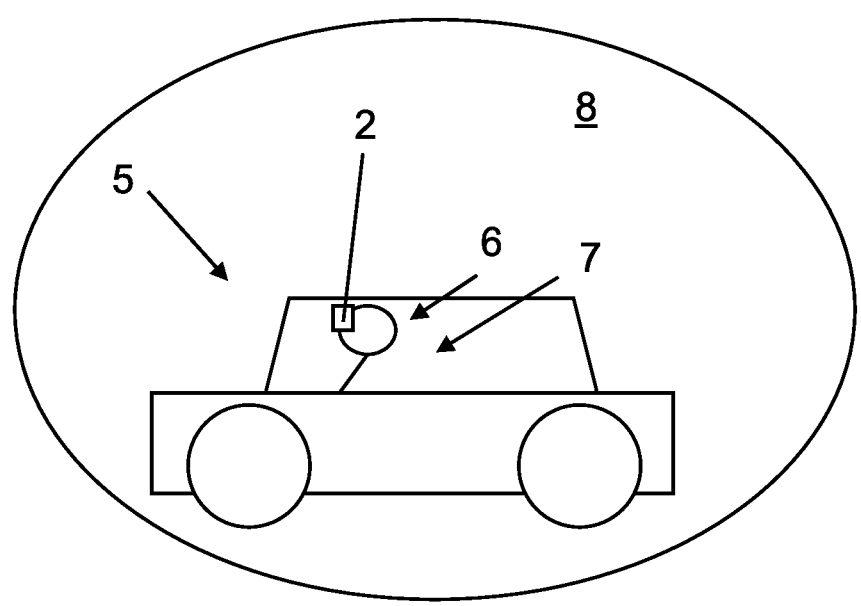
FIG. 2 is a schematic side view of a motor vehicle in which a wearer of the virtual reality glasses is sitting.

FIG. 2 shows a motor vehicle 5 in which a wearer 6 of the virtual reality glasses 2 is sitting. The control device 4 is configured so as to limit a recording range of the recording device 3, not illustrated in FIG. 2, to the vehicle interior 7 in order to eliminate distortions, resulting from a relative movement of the motor vehicle 5 with respect to the vehicle surroundings 8, with regard to the recording of the relative movement of the virtual reality glasses 2 with respect to the vehicle interior 7.

The recording range of the recording device 3 may for example be limited by using a sensor, not illustrated here, of the recording device 3 whose range is limited to the vehicle interior 7 in any case. By way of example, it is possible to use an ultrasound sensor that in any case only has a range such that it is able to record the vehicle interior 7.

As an alternative or in addition, it is also possible to use a sensor, likewise not illustrated here, of the recording device 3 whose range is for example limited to the vehicle interior 7 by the control device 4. This sensor may for example also have a further range by construction, such that it could theoretically also record objects beyond the vehicle interior 7 and thus also record a relative movement of the virtual reality glasses 2 with respect to the vehicle surroundings 8. However, in order to limit the recording range of the recording device 3, in the case of the sensor, the range of this sensor is simply restricted to the vehicle interior 7. Such a sensor is thus also able to detect only the vehicle interior 7, such that the vehicle surroundings 8 are completely blended out when recording the relative movement of the virtual reality glasses 2.

As an alternative or in addition, it is also possible for the recording range of the recording device 3 to be limited by using a camera, not illustrated in more detail here, of the recording device 3 and in the process to set a region, located outside the vehicle interior 7, in particular the vehicle surroundings 8, out of focus. The camera may for example have an electrically adjustable lens that is able to be driven by way of the control device 4. In this case, the control device 4 is easily able to adjust the lens such that the camera of the recording device 3 is simply able to detect only the vehicle interior 7 in focus. It may also be ensured in this case that only a relative movement of the virtual reality glasses 2 with respect to the vehicle interior 7 is able to be detected based on the sensor data provided by way of the recording device 3.

By limiting the recording range of the recording device 3, it is thus able to be ensured that, for example in the case of a moving motor vehicle 5, objects rolling past windows of the motor vehicle 5 and within the vehicle surroundings 8, such as for example trees, buildings or even other vehicles, are not able to be detected at all by the recording device 3. As a result, there is no possibility of distortions with regard to the recording of the relative movement of the virtual reality glasses 2 with respect to the vehicle interior 7, since relative movements of the motor vehicle 5 with respect to the vehicle surroundings 8 are simply irrelevant to the recording device 3, since it is not able to detect such relative movements at all.

By way of example, the virtual reality glasses 2 may themselves record whether the motor vehicle 5 is moving, wherein, if so, the recording range of the recording device 3 is automatically limited to the vehicle interior 7 by way of the control device 4. As an alternative or in addition, it is also possible for the wearer 6 for example to have to press a button on the virtual reality glasses 2 or perform any other predefined user input in order to ensure that the recording range of the recording device 3 is limited to the vehicle interior 7. It is furthermore also possible for the recording range of the recording device 3 to be limited to the vehicle interior 7 as soon as an application that is restricted to use in the motor vehicle 5 is executed by way of the virtual reality glasses 2. By way of example, the virtual reality glasses 2 may be configured so as to execute a type of drive-in cinema application that is restricted to use in the motor vehicle 5. As soon as this application is executed, the recording range of the recording device 3 is automatically limited to the vehicle interior 7.

It is also possible in principle for example for the virtual reality glasses 2 to be able to automatically record whether they are located in the vehicle interior 7, wherein the recording range of the recording device 3 is limited automatically to the vehicle interior 7 if so. If the wearer 6 of the virtual reality glasses 2 is thus not located in the vehicle interior 7, then the recording range of the recording device 3 is also not restricted such that it is able to cover only a region of the size of the vehicle interior 7. The virtual reality glasses 2 may thus switch on and off independently and adapt the recording range of the recording device 3 to the appropriate situation, that is to say whether the virtual reality glasses 2 are already in the vehicle interior 7 or outside the motor vehicle 5.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a head-wearable electronic display device, comprising:
    determining a relative movement of the electronic display device with respect to a vehicle interior of the vehicle using a recording device arranged on the electronic display device, a recording range of the recording device being limited to the vehicle interior to eliminate distortions resulting from a relative movement of the vehicle with respect to external vehicle surroundings, with regard to recording of the relative movement of the electronic display device with respect to the vehicle interior by the recording device;
    adapting a virtual perspective of a wearer of the electronic display device to virtual content according to the relative movement determined using the recording device;
    determining whether the vehicle is moving; and
    when the vehicle is determined to be moving, limiting the recording range of the recording device to the vehicle interior by setting the detection range of the sensor so that external vehicle surroundings are not able to be recorded by the recording device,
    wherein the recording range of the recording device itself is limited to the vehicle interior by a sensor of the recording device having a detection range which is set so that external vehicle surroundings are not able to be recorded by the recording device.

2. A method for operating a head-wearable electronic display device, comprising:
    determining a relative movement of the electronic display device with respect to a vehicle interior of a vehicle using a recording device arranged on the electronic display device, a recording range of the recording device being limited to the vehicle interior to eliminate distortions resulting from a relative movement of the vehicle with respect to external vehicle surroundings, with regard to recording of the relative movement of the electronic display device with respect to the vehicle interior by the recording device; and
    adapting a virtual perspective of a wearer of the electronic display device to virtual content according to the relative movement determined using the recording device,
    wherein
    the recording device includes a camera to record the relative movement of the electronic display device with respect to the vehicle interior, and
    the recording range of the recording device is limited to the vehicle interior by adjusting a lens setting of the camera so that regions located outside the vehicle interior are set out of focus and only the vehicle interior is recorded by the recording device.

3. The method according to claim 1, further comprising:
    limiting the recording range of the recording device to the vehicle interior in response to receiving a predefined user input, by setting the detection range of the sensor so that external vehicle surroundings are not able to be recorded by the recording device.

4. The method according to claim 1, further comprising:
    limiting the recording range of the recording device to the vehicle interior in response to execution of an application, by the electronic display device, which is restricted to use in the vehicle, by setting the detection range of the sensor so that external vehicle surroundings are not able to be recorded by the recording device.

5. The method according to claim 1, further comprising:
    determining whether the electronic display device is located in the vehicle interior; and
    when the electronic display device is determined to be located in the vehicle interior, limiting the recording range of the recording device to the vehicle interior, by setting the detection range of the sensor so that external vehicle surroundings are not able to be recorded by the recording device.

6. A display system for displaying virtual content, comprising:
    a head-wearable electronic display device;
    a recording device, arranged on the electronic display device, configured to determine a relative movement of the electronic display device with respect to a vehicle interior of a vehicle; and
    a controller configured to
        limit a recording range of the recording device to the vehicle interior to eliminate distortions resulting from a relative movement of vehicle with respect to external vehicle surroundings, with regard to recording of the relative movement of the electronic display device with respect to the vehicle interior by the recording device, and
        adapt a virtual perspective of a wearer of the electronic display device to virtual content according to the relative movement determined using the recording device,
    wherein
    the recording range of the recording device itself is limited to the vehicle interior by a sensor of the recording device having a detection range which is set so that external vehicle surroundings are not able to be recorded by the recording device,
    the electronic display device is configured to determine whether the vehicle is moving, and
    when the electronic display device determines the vehicle is moving, the controller is configured to automatically limit the recording range of the recording device to the vehicle interior by setting the detection range of the sensor so that external vehicle surroundings are not able to be recorded by the recording device.

7. The display system according to claim 6, wherein the electronic display device includes virtual reality glasses or augmented reality glasses.

8. A display system for displaying virtual content, comprising:
- a head-wearable electronic display device;
- a recording device, arranged on the electronic display device, configured to determine a relative movement of the electronic display device with respect to a vehicle interior of a vehicle; and
- a controller configured to
  - limit a recording range of the recording device to the vehicle interior to eliminate distortions resulting from a relative movement of vehicle with respect to external vehicle surroundings, with regard to recording of the relative movement of the electronic display device with respect to the vehicle interior by the recording device, and
  - adapt a virtual perspective of a wearer of the electronic display device to virtual content according to the relative movement determined using the recording device
- wherein
- the recording device includes a camera to record the relative movement of the electronic display device with respect to the vehicle interior, and
- the controller is configured to adjust a lens setting of the camera so that only the vehicle interior is recorded by the recording device and regions located outside the vehicle interior are set out of focus.

9. The display system according to claim 6, further comprising:
- the electronic display device includes an interface to receive a predefined user input, and
- when the interface receives the predefined user input, the controller is configured to limit the recording range of the recording device to the vehicle interior by setting the detection range of the sensor so that external vehicle surroundings are not able to be recorded by the recording device.

10. The display system according to claim 6, wherein
- the electronic display device is configured to execute an application which is restricted to use in the vehicle, and
- the controller is configured to limit the recording range of the recording device to the vehicle interior in response to execution of the application by the electronic display device by setting the detection range of the sensor so that external vehicle surroundings are not able to be recorded by the recording device.

11. A display system for displaying virtual content, comprising:
- a head-wearable electronic display device configured to detect whether the electronic display device is located inside a vehicle interior or outside the vehicle interior;
- a recording device, arranged on the electronic display device, configured to determine a relative movement of the electronic display device with respect to the vehicle interior of a vehicle; and
- a controller configured to
  - limit a recording range of the recording device to the vehicle interior to eliminate distortions resulting from a relative movement of vehicle with respect to external vehicle surroundings, with regard to recording of the relative movement of the electronic display device with respect to the vehicle interior by the recording device, and
  - adapt a virtual perspective of a wearer of the electronic display device to virtual content according to the relative movement determined using the recording device,
- wherein
- when the electronic display device detects the electronic display device is located inside the vehicle interior, the controller is configured to automatically limit the recording range of the recording device to the vehicle interior, and
- when the electronic display device detects the electronic display device is located outside the vehicle interior, the controller is configured to set the recording range of the recording device to a recording range which is larger than when the recording range of the recording device is limited to the vehicle interior.

12. The display system according to claim 11, wherein
- the electronic display device is configured to detect the electronic display device is located inside the vehicle interior based on a signal transmitted from a transponder provided in the vehicle.

13. The display system according to claim 6, further comprising:
- the vehicle, the vehicle including at least one vehicle sensor which provides positional data of the recording device with respect to the vehicle interior to the controller, and
- the controller is configured to limit the recording range of the recording device to the vehicle interior based on the positional data of the recording device provided by the at least one vehicle sensor and with reference to known dimensional data of the vehicle interior, by setting the detection range of the sensor of the recording device so that external vehicle surroundings are not able to be recorded by the recording device.

* * * * *